United States Patent [19]

Broyles et al.

[11] 4,314,718
[45] Feb. 9, 1982

[54] TENSILE RING COMPOSITE PIPE COUPLING

[75] Inventors: Harry C. Broyles, Sunnyvale; Laszlo Szalvay, San Carlos, both of Calif.

[73] Assignee: Raychem Corporation, Menlo Park, Calif.

[21] Appl. No.: 98,088

[22] Filed: Nov. 28, 1979

[51] Int. Cl.³ .............................................. F16L 13/04
[52] U.S. Cl. ....................................... 285/114; 285/41; 285/369; 285/381; 285/382.2; 285/382.7; 285/422
[58] Field of Search ................... 285/381, 21, 114, 41, 285/382.2, 369, 382.7, 382, 422; 403/273; 29/447; 156/344

[56] References Cited

U.S. PATENT DOCUMENTS

| | | | |
|---|---|---|---|
| 351,263 | 10/1886 | Hemphill | 285/381 |
| 1,115,411 | 10/1914 | Dixon | 29/447 |
| 2,984,899 | 5/1961 | Richter | 29/447 |
| 3,287,034 | 11/1966 | Bragg | 285/381 X |
| 3,524,665 | 8/1970 | Hohn et al. | 403/273 X |
| 3,730,562 | 5/1973 | Viazzi | 285/110 |
| 3,827,727 | 8/1974 | Moebius | 285/27 |
| 3,836,182 | 9/1974 | Miller | 285/114 |
| 3,872,573 | 3/1975 | Nichols et al. | 29/447 |
| 4,070,044 | 1/1978 | Carrow | 285/156 |
| 4,124,231 | 11/1978 | Ahlstone | 285/18 |
| 4,135,743 | 1/1979 | Hughes | 285/115 |

FOREIGN PATENT DOCUMENTS

| | | | |
|---|---|---|---|
| 2448160 | 5/1975 | Fed. Rep. of Germany | 285/381 |
| 2306784 | 5/1976 | France | 285/381 |
| 992488 | 5/1965 | United Kingdom . | |
| 1232741 | 5/1971 | United Kingdom . | |
| 1488393 | 10/1977 | United Kingdom . | |
| 1494881 | 12/1977 | United Kingdom . | |
| 1553427 | 8/1979 | United Kingdom . | |

Primary Examiner—Dave W. Arola
Attorney, Agent, or Firm—James W. Peterson

[57] ABSTRACT

The invention is a composite pipe coupling having a corrosion resistant liner which seals pipes to be coupled by utilization of a heat recoverable metallic material and having a pair of complementary heat recoverable metallic tensile rings and an external support structure which supplement the tensile strength of said liner, and of the overall coupling.

4 Claims, 3 Drawing Figures

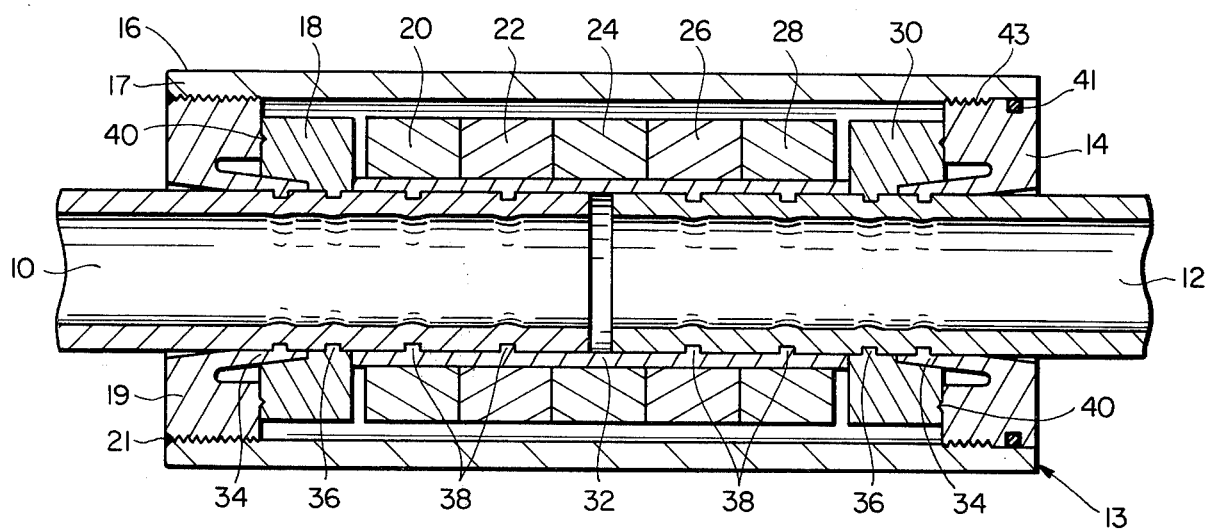
FIG_1
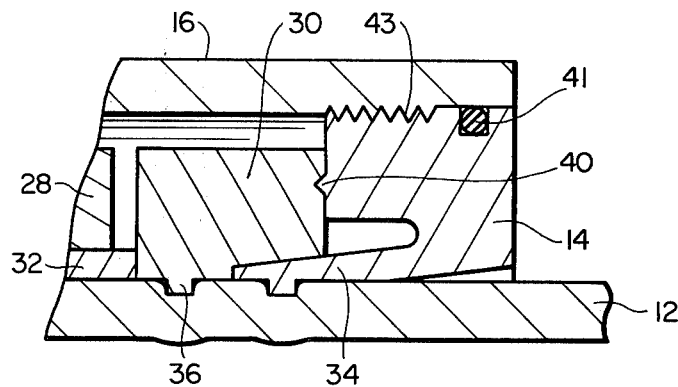
FIG_2
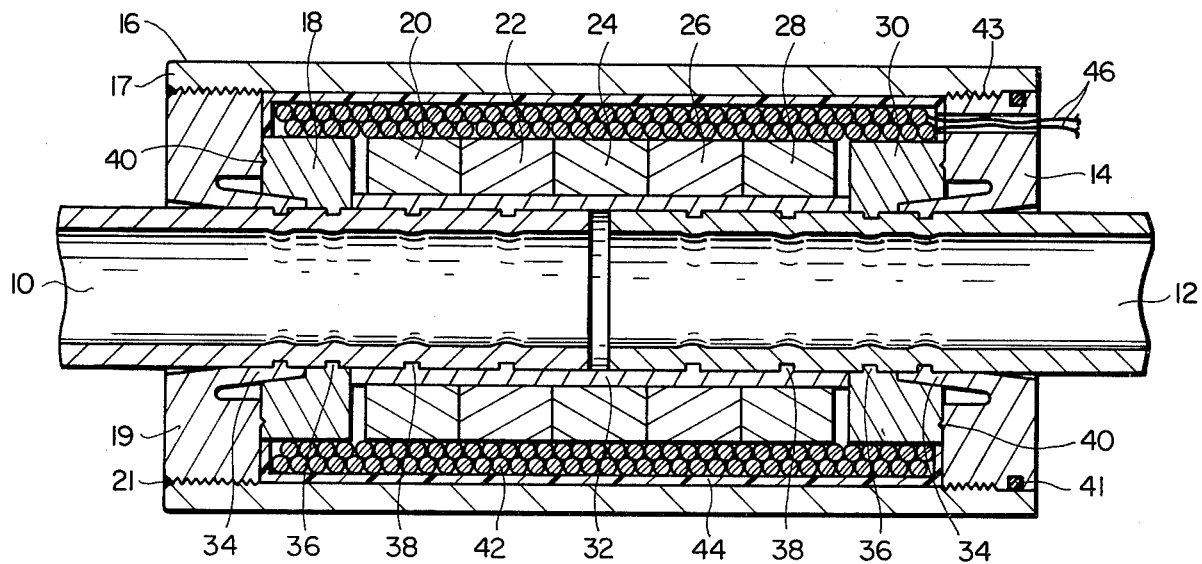
FIG_3

TENSILE RING COMPOSITE PIPE COUPLING

BACKGROUND OF THE INVENTION

In the past, heat-recoverable metal couplings have been developed for joining pipes together for such applications as aircraft hydraulic systems. See for example U.S. Pat. No. 4,135,743, issued Jan. 23, 1979, which is assigned to the assignee of the present invention. As discussed in said patent, couplings have been made entirely out of heat-recoverable metal and are referred to generally as monolithic couplings. Composite couplings have been made using a liner which is driven by heat-recoverable metal to effect sealing. When such a composite pipe coupling having a liner is utilized, the tensile strength characteristics of the coupling itself depend primarily upon the thickness or cross-sectional area of the liner. It can be understood, therefore, that an increase in tensile load strength requires an increase in thickness of the liner and correspondingly a greater driving force to crush the liner with respect to the pipes being coupled. It must be understood that even if the heat-recoverable metal driver portion is unitary it will carry only a nominal amount of tensile load since it is only in frictional contact with the liner. If the driver portion is not unitary, i.e., if it is a plurality of ring segments it would obviously be incapable of carrying any tensile load. Such prior art devices are therefore limited in tensile strength and utility.

The subject composite pipe coupling has been designed for all diameter pipe and especially for large diameter pipe utilized in undersea gas and oil transport. The subject coupling must be capable of withstanding high hydraulic or pneumatic pressure internally and high stresses created by movement of undersea piping by the sea itself during operation. The subject invention provides a composite pipe coupling having a corrosion resistant liner wherein the tensile strength of the composite coupling is not limited by the tensile strength of the lining. The subject invention provides a composite pipe coupling having a pair of tensile rings and complementary external support structure which provide high overall coupling strength independent of liner strength and which both reduces the galvanic corrosion potential and further insures against external contamination.

SUMMARY OF THE INVENTION

It is the purpose of the instant invention to provide a high pressure pipe coupling that is resistant to galvanic corrosion and has superior strength characteristics. To accomplish this purpose, the instant invention provides a device utilizing a liner driven by sections of heat-recoverable metal and having a pair of tensile rings and complementary external support structure. Said tensile rings and external support structure providing superior tensile strength capability for the overall coupling independent of the liner, and minimizing galvanic corrosion potential as well as insuring sealing from external contamination.

OBJECTS OF THE INVENTION

It is a primary object of the instant invention to provide a high strength coupling utilizing heat-recoverable metal.

It is yet another object of the instant invention to provide a composite pipe coupling having superior pipe wall penetration and capable of superior tensile loading.

It is also an object of the instant invention to provide a composite pipe coupling having superior resistance to process fluid corrosion, galvanic corrosion and contamination resistance.

It is a further object of the instant invention to provide a composite pipe coupling that is capable of thermally controlled pipe sealing.

It is also a further object of the instant invention to provide a composite pipe coupling that has superior tensile loading capability independent of the tensile strength of a liner.

It is still another object of the instant invention to provide a thermally activated, high tensile loading coupling for rapid subsea installation requiring no subsea welding and not employing flanges which are leak prone.

Other and further objects and advantages will become obvious hereinafter.

DESCRIPTION OF THE DRAWING

FIG. 1 is a cross-sectional view of the composite pipe coupling of the instant invention.

FIG. 2 is an expanded view of a portion of FIG. 1.

FIG. 3 is a cross-sectional view of the composite pipe coupling of FIG. 1 wherein supplemental heaters are utilized.

DESCRIPTION OF THE PREFERRED EMBODIMENT

With reference to the drawing, FIG. 1 illustrates a cross-section of a composite pipe coupling connecting pipes 10 and 12. In operation, the pipes 10 and 12 are positioned within the composite pipe coupling. The composite pipe coupling comprises an external support means shown generally at 13, a pair of tensile rings 18 and 30, a liner means 32, and driver means for said liner. Liner 32 is thin in cross-section and is preferably made from the same material as the pipes 10 and 12 in order to minimize process fluid corrosion. The driver means for said liner preferably comprises drivers 20, 22, 24, 26 and 28, which are positioned concentrically around liner 32. These drivers are made from heat-recoverable metal. Although a plurality of drivers are utilized, it is within the scope of the instant invention to provide a one piece or unitary driver. Driver 24 has less recovery than drivers 20, 22, 26 and 28 because it is not desirable to deform the ends of pipes 10 and 12, which could possibly constrict flow within the pipes or weaken the connection. It is understood that the degree of recovery of memory type metals is controllable, and depends upon the amount of deformation it is subjected to in its martensitic state. It is also understood that any number of rings may be used. It is important to note that segmenting the driver means has several advantages. One such advantage is the ease of manufacture as for example by ring rolling of the individual segments such as drivers 20, 22, 24, 26 and 28, which would not be possible if the driver means were unitary. Ring rolling the individual segments improves the mechanical properties and performance of each segment. Ring rolling will develop an orientation or texture in a preferred manner with respect to the direction of maximum strain. Since this direction is the same (tangential) as the hoop stresses developed in the rings during their expansion and recovery, the ring rolling process will improve the mechanical properties of the rings.

It is also more economical to manufacture the driver in segments rather than by machining a one piece driver. One of the most important advantages of the segmented design is that the final coupling is inherently more reliable. Specifically, if any segment should fail the coupling will generally remain operable.

A pair of tensile rings 18 and 30 are positioned concentrically around pipes 10 and 12. Said pair of tensile rings 18 and 30 are positioned axially outside of liner 31 and drivers 20, 22, 24, 26, and 28. Said pair of tensile rings 18 and 30 are further positioned axially within and are in contact with external support structure members 16 and 14, respectively.

The tensile rings and the drivers discussed above are made from heat-recoverable metals which are commonly called memory alloys. These ring-like members have been deformed from an original configuration and retain their deformed configuration until they are heated, at which time they will recover toward their original configuration. These alloys exhibit a so-called martensitic transformation from a low temperature form to a high temperature form and it is this transformation which produces the memory effect. Among such alloys there may be mentioned for example, various alloys of titanium and nickel which are described in U.S. Pat. Nos. 3,174,851, 3,351,463, 3,753,700, 3,759,552, British Pat. Nos. 1,327,441, and 1,327,442 and NASA Publication SP 110, "55-Nitinol-The Alloy with a Memory, etc." (U.S. Government Printing Office, Washington, D.C. 1972). The property of heat-recoverability is not confined to such titanium nickel alloys. Thus for example, various beta-brass alloys have been demonstrated to exhibit this property in for example, N. Nakaniski et al., Scripta Metallurgica 5, 443–440 (Pergamon Press, 1971) and such materials may be alloyed to lower their transition temperatures to cryogenic regimes by known techniques. Similarly, type 304 stainless steels have been shown to enjoy such characteristics (See E. Enami et al., Id at pages 663–68).

As shown in FIG. 1, drivers 20, 22, 24, 26 and 28 have been heated and they have constricted radially on the liner 32 and have caused the liner 32 to seal with respect to pipes 10 and 12. Likewise, the tensile rings 18 and 30 have been heated and they have also constricted radially on pipes 10 and 12 and their continuous ring-like teeth 36 cut into the pipes 10 and 12. As they constrict, they also drive the sealing lips 34 of the external support structures 14 and 16 radially to contact pipes 10 and 12 and cause the teeth on sealing lips 34 to seal with respect to pipes 10 and 12. It is important to note that external support structures 14 and 16 are likewise made from material similar to pipes 10 and 12 to minimize or eliminate the galvanic corrosion potential. The external support structure illustrated in FIG. 1 is a canister 16 and a complementary lid 14. The canister 16 has a generally cylindrical sidewall and an end wall having an opening therethrough to accomodate one of the pipes to be coupled. It can be seen in FIG. 1 that the canister 16 is made from a sleeve 17 and threaded end 19 which is welded at 21 to the sleeve 17. Likewise the lid 14 has an opening therethrough to accomodate the other pipe to be coupled. The lid 14 is attached to the canister by conventional means, as for example, by threading as can be seen in FIG. 2. Other fastening means such as flanges and bolts, welding, adhesives, etc., would be within the scope of the invention. It is also within the scope of the invention to vary the configuration of the canister from cylindrical to cubical to spherical, etc., as may be desired. It is also possible to make the external support means in the form of two half shells which could be coupled together by flanges and bolts. It is important to note that the lid 14 and tensile ring 30 may be sealed with respect to each other by a metal to metal tooth seal 40 to keep out external contamination such as sea water. A similar seal utilizing a tooth seal 40 is made between tensile ring 18 and canister 16 as can be seen in FIG. 1.

It can be seen in FIG. 1 that the inside surface of the liner 32 is provided with teeth 38 which cut into the pipes 10 and 12 for the purpose of sealing and for carrying some tensile load. Most of the tensile load, however, is carried by the pair of tensile rings 18 and 30 and is transferred to the external support structures 16 and 14. A pair of tensile rings and complementary external support structures provide superior coupling tensile strength independent of the tensile strength capabilities of the liner and driver. Therefore, the main function of liner 32 remains the maintenance of a good seal with pipes 10 and 12. By this arrangement, even at high tensile loads, the liner 32 remains unaffected and able to maintain a good pipe seal. It can be seen in FIG. 1 that liner 32 axially abutts tensile rings 18 and 30 and therefore is capable of transmitting compression loads to tensile rings 18 and 30 and therefore to the external support structure. It is however, within the scope of the invention possible to space liner 32 axially from tensile rings and the complementary external support structure provide by far, the majority of the tensile strength of the composite pipe coupling.

During assembly, it is preferred to tighten the external support structure lid 14 during assembling the coupling to set the tooth seal 40 and to hold tensile rings 18 and 30 and liner 32 in position. It is also preferred to seal threads 43 at assembly with some conventional seal such as a sealing tape, etc. An "O" ring 41 is shown sealing the threads. Later when the coupling is installed it is possible to fill the coupling cavity through an external port (not shown) with a filler. Such a port can also be used for pressure testing the installed coupling assembly.

FIG. 3 illustrates an alternate embodiment of the instant invention wherein the device shown in FIG. 1 is supplemented with a controllable heating device. A heat may be desired when a memory metal element with austenitic start temperature above ambient is utilized. An electrical heating element 42 is placed in the cavity between the external support means and the driver means. Some insulation 44 is placed between the heating element 42 and the external support means to increase the efficiency of the heating element. Power leads 46 connect the heating element 42 to a power source (not shown) to energize the heating element as desired. In the case where the transformation temperature is below the ambient temperature, the heater will accelerate the transformation. It is within the scope of the invention to utilize other heating means in the cavity between the external support means and the driver means, ie chemical reaction heating devices, etc., or to provide heated mediums which is pumped through the coupling cavity.

From the foregoing detailed description it is evident that there are a number of changes, adaptations and modifications of the present invention which come within the province of those skilled in the art. However, it is intended that all such variations not departing from the spirit of the invention be considered as within the scope thereof as limited solely by the appended claims.

What is claimed is:

1. A composite pipe coupling comprising:

(a) a liner means having an opening therethrough capable of receiving the ends of the pipes to be connected;

(b) driver means of heat-recoverable metallic material having an opening therethrough mounted concentrically around said liner means, said driver means constricting radially inwardly upon heat recovery to grip said liner means and to deform said liner means into a sealing condition with pipes to be connected;

(c) a pair of tensile rings of heat-recoverable metallic material, one of said tensile rings being axially mounted adjacent and in axial contact with one end of said liner means, and the other of said tensile rings being axially mounted and in contact with the other end of said liner means, said tensile rings constricting radially inwardly upon heat recovery to each grip a pipe to be connected; and (d) external support means having an opening therethrough mounted concentrically around said liner, driver means and said tensile rings to axially contain and support said tensile rings and the liner means positioned between said tensile rings.

2. A device as in claim 1 wherein said external support means has a pair of concentric sealing lips one of which is located at each end of said external support means, each of said lips extending axially inwardly toward said pair of tensile rings, a portion of each said sealing lips extending under each of said pair of tensile rings, respectively, said tensile rings constricting radially upon recovery to grip the portion of said sealing lips under the tensile rings to seal said external support structure with respect to pipes to be connected from external contamination.

3. A device as in claim 2 wherein said driver means comprises a plurality of ring-like segments distributed axially along and over said liner means.

4. A device as in claim 2 wherein said driver means has non-uniform heat-recovery along its axial dimension so that the gripping forces of said driver means are non-uniform.

* * * * *